United States Patent [19]
Kotaki et al.

[11] Patent Number: 5,200,841
[45] Date of Patent: Apr. 6, 1993

[54] APPARATUS FOR BINARIZING IMAGES

[75] Inventors: Kenichi Kotaki, Tokyo; Hideo Kimura; Shigeru Takemoto, both of Kawasaki, all of Japan

[73] Assignee: Nikon Corporation, Tokyo, Japan

[21] Appl. No.: 704,223

[22] Filed: May 22, 1991

[30] Foreign Application Priority Data

May 25, 1990 [JP] Japan .................................. 2-135995
May 30, 1990 [JP] Japan .................................. 2-140486

[51] Int. Cl.⁵ .............................................. H04N 1/40
[52] U.S. Cl. .................................... 358/455; 358/463; 358/453
[58] Field of Search ............... 358/401, 429, 444, 445, 358/443, 447, 448, 452, 453, 454, 455, 456, 457, 458, 460, 461, 462, 463, 465, 467

[56] References Cited

U.S. PATENT DOCUMENTS

| | | | |
|---|---|---|---|
| 4,734,784 | 3/1988 | Tanaka ................................. | 358/456 |
| 4,742,400 | 5/1988 | Tsuji ..................................... | 358/457 |
| 4,876,610 | 10/1989 | Ohsawa et al. ...................... | 358/443 |
| 4,878,125 | 10/1989 | Katayama et al. .................. | 358/443 |
| 4,893,188 | 1/1990 | Murakami et al. .................. | 358/456 |
| 4,924,509 | 5/1990 | Yokomizo ........................... | 358/456 |
| 5,001,767 | 3/1991 | Yoneda et al. ...................... | 358/453 |

FOREIGN PATENT DOCUMENTS 58-117773  7/1983  Japan .

Primary Examiner—Edward L. Coles, Sr.
Assistant Examiner—Jerome Grant, II
Attorney, Agent, or Firm—Shapiro and Shapiro

[57] ABSTRACT

The invention provides an image binarizing apparatus which includes multi-value image window circuitry for retrieving multi-value image data; a first binarizing circuit for binarizing the multi-value image data in accordance with a variable threshold determined based on the multi-value image data of pixels around a desired pixel; a second binarizing circuit for binarizing the multi-value image data in accordance with a predetermined threshold; and binary image window circuitry for retrieving image data which has been binarized by the second binarizing circuit. The image binarizing apparatus further includes edge detecting circuitry for comparing and collating binary two-dimensional image data obtained by the binary image window circuitry with edge templates each having a predetermined angle; memory circuitry for storing two types of smoothly binarized data in addresses which are generated based not only on the multi-value image data obtained by the multi-value image window circuitry, but also on the edge detection data which is output from the edge detecting circuitry; and selecting circuitry for selecting either one of the two types of smooth binary image data which are output either from the first binarizing circuit or from the memory circuitry.

7 Claims, 13 Drawing Sheets

FIG. 3A

90° EDGE TEMPLATE

FIG. 3B

0° EDGE TEMPLATE

FIG. 3C

135° EDGE TEMPLATE

FIG. 3D

45° EDGE TEMPLATE

RELATIVE POSITIONS OF PIXELS

90° EDGE MULTI-VALUE DATA

0° EDGE MULTI-VALUE DATA

135° EDGE MULTI-VALUE DATA

45° EDGE MULTI-VALUE DATA

FIG. 8

| RESULT OF BINARIZING $C_2$ | 0 (BLACK) | | 1 (WHITE) | |
|---|---|---|---|---|
| COMPARISON OF NUMERICAL VALUE OF $C_1$ WITH THAT OF $C_2$ | $C_1 \geq C_2$ | $C_1 < C_2$ | $C_1 \leq C_2$ | $C_1 > C_2$ |
| NUMERICAL VALUE OF $C_2$ | | | | |
| 0 | 4 | 4 | 4 | 4 |
| 1 | 5 | 5 | 4 | 4 |
| 2 | 5 | 5 | 4 | 4 |
| 3 | 6 | 6 | 4 | 4 |
| 4 | 6 | 6 | 4 | 4 |
| 5 | 7 | 6 | 5 | 5 |
| 6 | ⑧ | 7 | ☐5 | 6 |
| 7 | 9 | 8 | 6 | 7 |
| 8 | 9 | 9 | 7 | 8 |
| 9 | A | A | 8 | 8 |
| A | B | B | 9 | 9 |
| B | C | C | A | A |
| C | C | C | A | A |
| D | C | C | B | B |
| E | C | C | B | B |
| F | C | C | C | C |

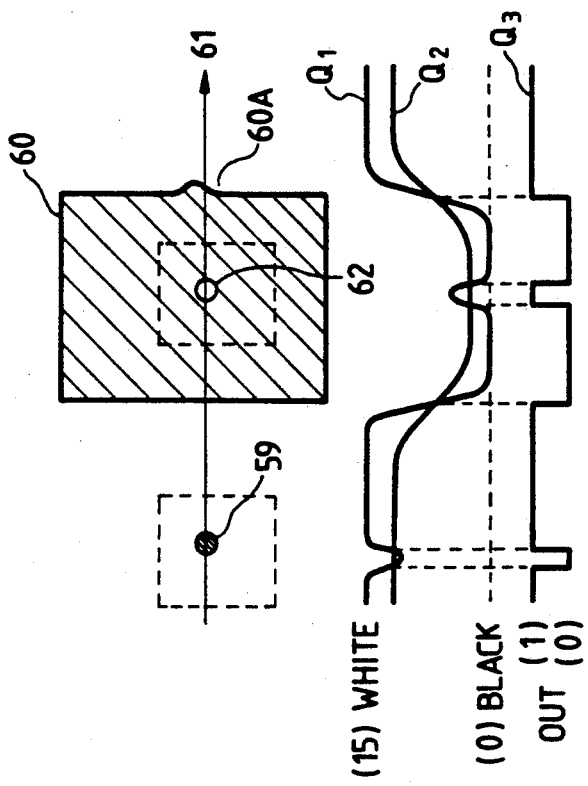
FIG. 12
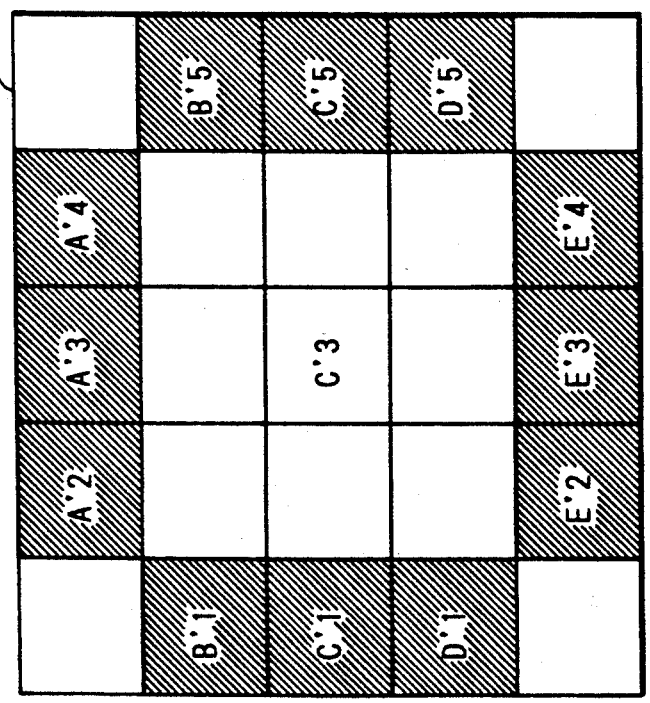
FIG. 11
FIG. 13
| MEAN VALUES | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| THRESHOLDS | 2 | 2 | 2 | 3 | 5 | 6 | 7 | 8 | 9 | 10 | 10 | 11 | 12 | 13 | 13 | 13 |

FIG. 14A

| 0 | 0 | 0 | 0 | 0 | 0 |
|---|---|---|---|---|---|
| 0 | 0 | 0 | 0 | 0 | 0 |
| 0 | 0 | 1 | 0 | 0 | 0 |
| 0 | 1 | 3 | 2 | 0 | 0 |
| 0 | 0 | 1 | 0 | 0 | 0 |
| 0 | 0 | 0 | 0 | 0 | 0 |
| 0 | 0 | 0 | 0 | 0 | 0 |

MULTI-VALUE DATA OF FINE LIGHT PATTERN

FIG. 14B

| 0 | 0 | 0 | 0 | 0 | 0 |
|---|---|---|---|---|---|
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |
| 0 | 0 | 0 | 0 | 0 | 0 |

SIMPLE BINARIZATION (USING THRESHOLD "7")

FIG. 14C

| 0 | 0 | 0 | 0 | 0 | 0 |
|---|---|---|---|---|---|
| 0 | 0 | 0 | 0 | 0 | 0 |
| 0 | 0 | 0 | 0 | 0 | 0 |
| 0 | 0 | 1 | 1 | 0 | 0 |
| 0 | 0 | 0 | 0 | 0 | 0 |
| 0 | 0 | 0 | 0 | 0 | 0 |
| 0 | 0 | 0 | 0 | 0 | 0 |

BINARIZATION IN ACCORDANCE WITH THIS INVENTION

FIG. 15A

| 15 | 15 | 15 | 15 | 15 | 15 |
|----|----|----|----|----|----|
| 15 | 15 | 15 | 15 | 15 | 15 |
| 15 | 15 | 14 | 15 | 15 | 15 |
| 15 | 14 | 12 | 11 | 15 | 15 |
| 15 | 15 | 14 | 15 | 15 | 15 |
| 15 | 15 | 15 | 15 | 15 | 15 |
| 15 | 15 | 15 | 15 | 15 | 15 |

MULTI-VALUE DATA OF FINE SHADE PATTERN

FIG. 15B

| 1 | 1 | 1 | 1 | 1 | 1 |
|---|---|---|---|---|---|
| 1 | 1 | 1 | 1 | 1 | 1 |
| 1 | 1 | 1 | 1 | 1 | 1 |
| 1 | 1 | 1 | 1 | 1 | 1 |
| 1 | 1 | 1 | 1 | 1 | 1 |
| 1 | 1 | 1 | 1 | 1 | 1 |
| 1 | 1 | 1 | 1 | 1 | 1 |

SIMPLE BINARIZATION (USING THRESHOLD "7")

FIG. 15C

| 1 | 1 | 1 | 1 | 1 | 1 |
|---|---|---|---|---|---|
| 1 | 1 | 1 | 1 | 1 | 1 |
| 1 | 1 | 1 | 1 | 1 | 1 |
| 1 | 1 | 0 | 0 | 1 | 1 |
| 1 | 1 | 1 | 1 | 1 | 1 |
| 1 | 1 | 1 | 1 | 1 | 1 |
| 1 | 1 | 1 | 1 | 1 | 1 |

BINARIZATION IN ACCORDANCE WITH THIS INVENTION

FIG. 16A

| 0 | 0 | 3 | 13 | 15 | 15 | 15 |
|---|---|---|----|----|----|----|
| 0 | 0 | 2 | 13 | 15 | 15 | 15 |
| 0 | 0 | 1 | 10 | 15 | 15 | 15 |
| 0 | 0 | 0 | 4  | 12 | 15 | 15 |
| 0 | 0 | 0 | 1  | 8  | 15 | 15 |
| 0 | 0 | 0 | 4  | 11 | 15 | 15 |
| 0 | 0 | 1 | 10 | 15 | 15 | 15 |
| 0 | 0 | 2 | 13 | 15 | 15 | 15 |
| 0 | 0 | 3 | 13 | 15 | 15 | 15 |

MULTI-VALUE DATA

FIG. 16B

| 0 | 0 | 0 | 1 | 1 | 1 | 1 |
|---|---|---|---|---|---|---|
| 0 | 0 | 0 | 1 | 1 | 1 | 1 |
| 0 | 0 | 0 | 1 | 1 | 1 | 1 |
| 0 | 0 | 0 | 0 | 1 | 1 | 1 |
| 0 | 0 | 0 | 0 | 1 | 1 | 1 |
| 0 | 0 | 0 | 0 | 1 | 1 | 1 |
| 0 | 0 | 0 | 1 | 1 | 1 | 1 |
| 0 | 0 | 0 | 1 | 1 | 1 | 1 |
| 0 | 0 | 0 | 1 | 1 | 1 | 1 |

SIMPLE BINARIZATION
(USING THRESHOLD "7")

FIG. 16C

| 0 | 0 | 0 | 1 | 1 | 1 | 1 |
|---|---|---|---|---|---|---|
| 0 | 0 | 0 | 1 | 1 | 1 | 1 |
| 0 | 0 | 0 | 1 | 1 | 1 | 1 |
| 0 | 0 | 0 | 0 | 1 | 1 | 1 |
| 0 | 0 | 0 | 0 | 0 | 1 | 1 |
| 0 | 0 | 0 | 0 | 1 | 1 | 1 |
| 0 | 0 | 0 | 1 | 1 | 1 | 1 |
| 0 | 0 | 0 | 1 | 1 | 1 | 1 |
| 0 | 0 | 0 | 1 | 1 | 1 | 1 |

BINARIZATION (USING THRESHOLD "10")
IN ACCORDANCE WITH THIS INVENTION

APPARATUS FOR BINARIZING IMAGES

BACKGROUND OF THE INVENTION

1. Field of the Invention

The present invention relates to an image binarizing apparatus for binarizing multi-value image data which is output from an image taking device.

2. Related Background Art

Binarizing apparatuses have hitherto utilized multi-value image data which is obtained with A/D convertors by converting an analog video signal from image taking devices into a multi-value digital video signal having N-bit gradations. The binarizing apparatus simply binarizes such multi-value image data based on a fixed threshold, or processes it in the following way. A threshold is altered to be suitable for an image, based on surrounding pattern information, such as an isolated spot. The multi-value image data is then binarized so as not to lose information regarding the image. Also, an arithmetic technique, such as differential or integral calculus, is adapted to multi-value image data, which is binarized by the binarizing apparatus by using two-dimensional image filters.

Such a conventional binarizing apparatus, however, has a problem in that an unevenness in an amount equal to one pixel is formed in an edge pattern portion which should have been formed into a straight line, also information regarding fine light and shade patterns is lost.

Furthermore, to pick up information regarding fine light and shade patterns, after an offset voltage has been added to an analog video signal, a signal with a fixed amount of attenuation is delayed to compare it with the original analog video signal. An image data is thus binarized. Such a construction, however, has a serious disadvantage in that a signal which has been binarized is shifted time-wise in accordance with the amount of time during which the attenuated signal is delayed (a pattern position is shifted within an image plane to be taken).

SUMMARY OF THE INVENTION

A first object of the present invention is therefore to provide a binarizing apparatus which can inhibit the formation of an unevenness in an amount equal to one pixel, this formation being ascribable to a quantization error, and which, when an edge pattern portion is incomplete or a projection is present on an edge pattern portion, can generate binary image data without losing information regarding the incomplete edge pattern portion or the projection from an image after the image has been binarized.

A second object of the invention is to provide a binarizing apparatus which can accurately binarize an image signal having a small modulation factor or a fine light and shade pattern, and which can also accurately binarize even a light and shade edge.

The above first and second objects can be achieved by providing an image binarizing apparatus for binarizing the data item of a desired pixel among the multi-value image data items of pixels composed of plural bits, the multi-value image data items being output from an image taking device in a time series manner, the image binarizing apparatus comprising: multi-value image window circuitry for retrieving the multi-value image data items in the form of two dimensions, whereby the multi-value image window circuitry cuts a two-dimensional image in a small field of vision from an image plane to be taken; a first binarizing circuit for binarizing the multi-value image data items in accordance with a variable threshold which is determined based on the multi-value image data items of the pixels around the desired pixel; a second binarizing circuit for binarizing the multi-value image data items in accordance with a predetermined threshold; binary image window circuitry for retrieving image data which has been binarized by the second binarizing circuit, whereby the binary image window circuitry cuts a binary two-dimensional image in a small field of vision from an image plane to be taken; edge detecting circuitry for comparing and collating the binary two-dimensional image data retrieved by the binary image window circuitry with edge templates each having a predetermined angle, whereby the edge detecting circuitry detects whether or not the position of the desired pixel is on an edge, and outputs an edge direction in the form of edge detection data when the position of the desired pixel is on the edge; memory circuitry for storing two types of smoothly binarized data in addresses which are generated based not only on the multi-value image data items retrieved by the multi-value image window circuitry, but also on the edge detection data which is output from the edge detecting circuitry, the two types of smoothly binarized data stored in the memory circuitry being dependent on the smooth binary image data of a pixel adjacent to the desired pixel in the edge direction, the memory circuitry outputting two types of smooth binary image data in the addresses which correspond to the multi-value image data items and the edge detection data; and selecting circuitry for selecting either one of the two types of smooth binary image data which are output either from the first binarizing circuit or from the memory circuitry, whereby when the edge detecting circuitry detects that an edge is not present, the selecting circuitry selects an output from the first binarizing circuit, while on the contrary, when the edge detecting circuitry detects that an edge is present, the selecting circuitry selects either one of the two types of smooth binary image data which are output from the memory circuitry, this selection being based on the smooth binary image data of the pixel adjacent to the desired pixel in the edge direction.

In accordance with the above apparatus, the templates detect an edge. Multi-value image data on the edge as well as image data which has already been simply binarized on the edge are then returned in the form of feedback so as to determine the value of the pixel to be binarized (desired pixel). The value of the desired pixel is determined based not only on the inclination at which data is arranged on the edge, but also on binary information regarding a pixel previous to the desired pixel. Therefore, even when there is a quantization error of multi-value image data of pixels, the desired pixel can be binarized into the same value as the value of the previous pixel. It is thus possible to inhibit with certainty the formation of an unevenness caused by a quantization error when image data is binarized with a fixed threshold.

The above apparatus also makes it possible to accurately binarize the edge portions of a light and shade pattern, and also to accurately binarize even fine light and shade patterns. Thus a binary image is accurately generated as close as possible to the original image.

Furthermore, the first object of this invention can be achieved by providing an image signal binarizing apparatus for binarizing the data item of a desired pixel among multi-value image data items of pixels composed of plural bits, the multi-value image data items being output from an image taking device in a time series manner, the image signal binarizing apparatus comprising: multi-value image window circuitry for retrieving the multi-value image data items in the form of two dimensions, whereby the multi-value image window circuitry cuts a two-dimensional image in a small field of vision from an image plane to be taken; a binarizing circuit for binarizing the multi-value image data items in accordance with a predetermined threshold; binary image window circuitry for retrieving image data which has been binarized by the binarizing circuit, whereby the binary image window circuitry cuts a binary two-dimensional image in a small field of vision from an image plane to be taken; edge detecting circuitry for comparing and collating binary two-dimensional image data retrieved by the binary image window circuitry with edge templates each having a predetermined angle, whereby the edge detecting circuitry detects whether or not the position of the desired pixel is on an edge, and outputs an edge direction in the form of edge detection data when the position of the desired pixel is on the edge; memory circuitry for storing two types of smoothly binarized data in addresses which are generated based not only on the multi-value image data items retrieved by the multi-value image window circuitry, but also on the edge detection data which is output from the edge detecting circuitry, the two types of smoothly binarized data stored in the memory circuitry being dependent on the smooth binary image data of a pixel adjacent to the desired pixel in the edge direction, the memory circuitry outputting two types of smooth binary image data in the addresses which correspond to the multi-value image data items and the edge detection data; and selecting circuitry for selecting either one of the two types of smooth binary image data which are output either from the binarizing circuit or from the memory circuitry, whereby when the edge detecting circuitry detects that an edge is not present, the selecting circuitry selects an output from the binarizing circuit, while on the contrary, when the edge detecting circuitry detects that an edge is present, the selecting circuitry selects either one of the two types of smooth binary image data which are output from the memory circuitry, this selection being based on the smooth binary image data of the pixel adjacent to the desired pixel in the edge direction.

In accordance with the above apparatus, the templates detect an edge. Multi-value image data on the edge as well as image data which has already been simply binarized on the edge are then returned in the form of feedback so as to determine the value of the pixel to be binarized (desired pixel). The value of the desired pixel is determined based not only on the inclination at which data is arranged on the edge, but also on binary information regarding a pixel previous to the desired pixel. Therefore, even when there is a quantization error of multi-value image data of pixels, the desired pixel can be binarized into the same value as the value of the previous pixel. It is thus possible to inhibit with certainty the formation of an unevenness caused by a quantization error when image data is binarized with a fixed threshold.

Moreover, the second object of the invention can be achieved by providing an image signal binarizing apparatus for binarizing multi-value image data, comprising: a window circuit for arranging multi-value image data having been input in a two-dimensional $N \times N$ window to retrieve both the image data of a predetermined pixel within the window and the image data of plural pixels around the predetermined pixel; a mean value circuit for determining the mean value of the image data of the plural pixels around the predetermined pixel, which image data is retrieved by the window circuit; a threshold circuit for calculating a threshold based on the mean value determined by the mean value circuit; and a comparator for binarizing the image data of the predetermine pixel in accordance with the threshold calculated by the threshold circuit.

The above apparatus also makes it possible to accurately binarize the edge portions of a light and shade pattern, and also to accurately binarize even fine light and shade patterns. Thus a binary image is accurately generated as close as possible to the original image.

BRIEF DESCRIPTION OF THE DRAWINGS

FIGS. 3A to 3D are views illustrating four types of edge templates in edge detecting circuitry of FIG. 1;

FIG. 8 is a view illustrating a threshold table used for creating the look-up table in accordance with the invention;

FIG. 11 is a view illustrating a two-dimensional window and pixel data generated by window circuitry of FIG. 10;

FIG. 12 is a view illustrating image patterns, a threshold, a reading signal, a binarizing signal, and the operation of a binarizing circuit in FIG. 10;

FIG. 13 is a view illustrating a data table disposed in threshold circuitry of FIG. 10;

FIGS. 14A to 14C are views illustrating binarization of a fine light pattern made by a binarizing circuit in FIG. 10;

FIGS. 15A to 15C are views illustrating binarization of a fine dark pattern made by a binarizing circuit in FIG. 10;

FIGS. 16A to 16C are views illustrating binarization for a fine projection on an edge formed by a binarizing circuit in FIG. 10.

DESCRIPTION OF THE PREFERRED EMBODIMENTS

Figure 1:
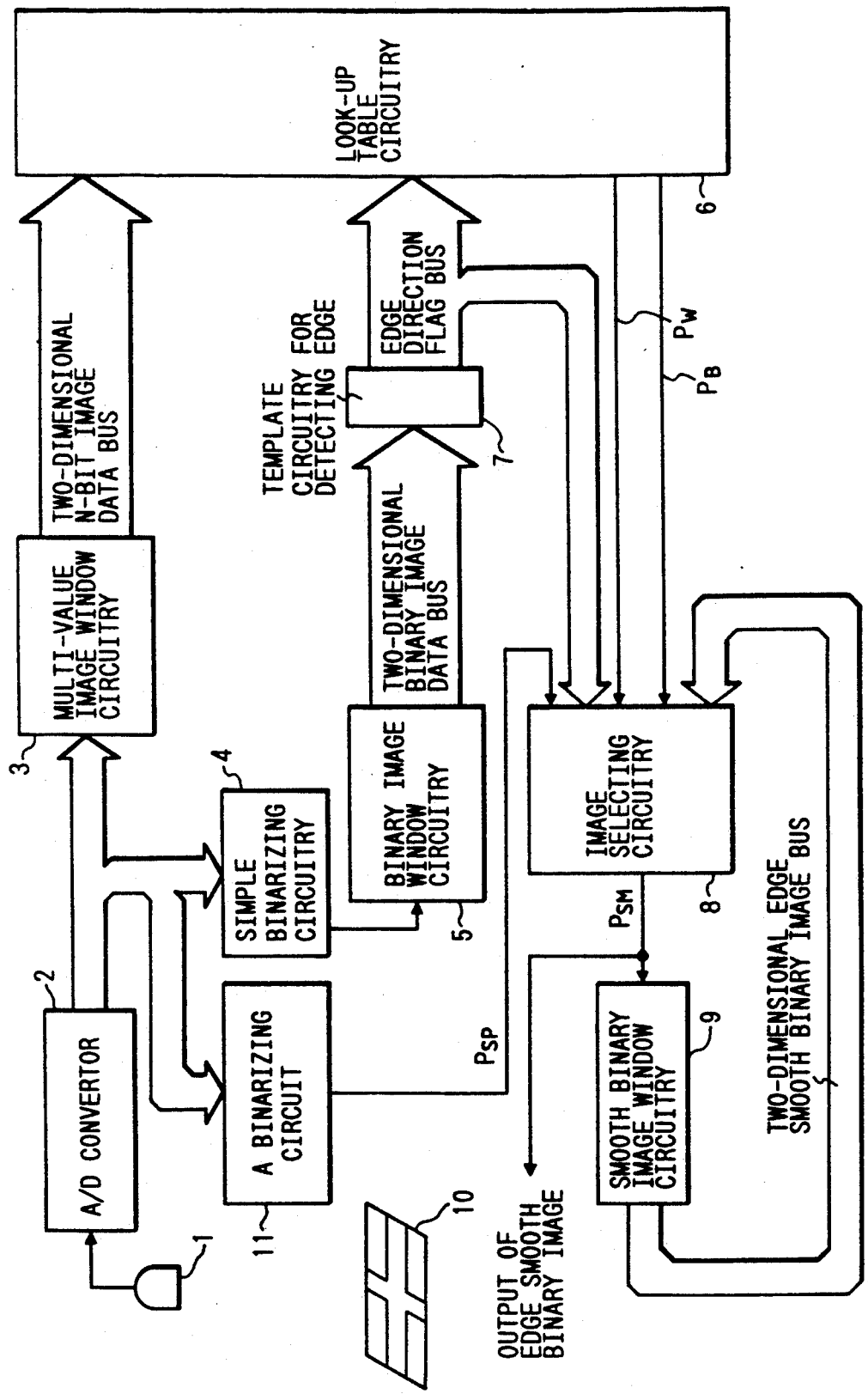
FIG. 1 is a block diagram showing a first embodiment of an image binarizing apparatus in accordance with the present invention.

FIG. 1 is a view showing the structure of an embodiment of the present invention.

In FIG. 1, a camera 1 takes a picture of a geometrical pattern on a material 10. An analog video signal which is output from the camera 1 is input to an A/D convertor 2 that converts the analog video signal into multi-value digital image data composed of "N" bits (N>1). This multi-value digital image data from the A/D converter 2 is input to multi-value image window circuitry 3, simple binarizing circuitry 4, and a binarizing circuit 11 of binarizing circuitry. The multi-value image window circuitry 3 retrieves the multi-value digital image data in the form of two dimensions; the simple binarizing circuitry 4 binarizes the multi-value image data based on a fixed threshold; and the binarizing circuit 11 binarizes the multi-value image data based a threshold which may be variable relative to surrounding images. An output from the multi-value image window circuitry 3 is input to look-up table circuitry 6. An output from the simple binarizing circuitry 4 is input to binary image window circuitry 5 in which it is converted into a binary image in the form of two dimensions. The binary image is then input to edge detecting circuitry 7 which uses templates each having a predetermined angle in order to detect the presence and direction of an edge. An output from the edge detecting circuitry 7, that is, an edge direction flag, is input to the look-up table circuitry 6. The look-up table circuitry 6 generates addresses based on the multi-value image data sent from the multi-value image window circuitry 3 and the edge direction flag transmitted from the edge detecting circuitry 7. The look-up table circuitry 6 then reads two types of smooth binary image data $P_W$ and $P_B$ which are stored in the addresses beforehand. In other words, the look-up table circuitry 6 determines whether the image data is $P_W$ or $P_B$, depending on whether a smooth binary image which is adjacent and previous to the edge direction of a pixel to be binarized is white or black.

The image data $P_W$ and $P_B$, or outputs from the look-up table circuitry 6, binary image data PSP transmitted from the binarizing circuit 11, the edge direction flag sent from the edge detecting circuitry 7, and smooth binary image data in the form of two dimensions, which has already been binarized and is sent from smooth binary image window circuitry 9, are all input to image selecting circuitry 8. A selecting operation of the image selecting circuitry 8 is performed as follows:

(1) When the image selecting circuitry 8 receives no edge direction flags from the edge detecting circuitry 7, it selects the output from the binarizing circuit 11.

(2) When, on the contrary, the image selecting circuitry 8 receives an edge direction flag from the edge detecting circuitry 7, it selects either smooth binary image data $P_W$ or $P_B$, which selected data is output from the look-up table circuitry 6. This selection is based on smooth binary image data which is adjacent and previous to the pixel to be binarized in an edge direction and which is retrieved by the smooth binary image window circuitry 9.

Previous binary image data which has been selected by and output from the image selecting circuitry and is present in the edge direction is two-dimensionally retrieved and stored in the smooth binary image window circuitry 9.

The operation of the image binarizing apparatus constructed as shown in FIG. 1 will now be described along with the details of the structure of the apparatus.

The camera 1 takes a picture of the geometrical pattern on the material 10. The analog video signal or output from the camera 1 is input to the A/D converter 2 in the format of a raster scan signal. In this embodiment, the A/D converter 2 outputs a 4-bit digital video signal. The output in a 4-bit state from the A/D converter 2 is first input to the simple binarizing circuitry 4 so as to binarize it with a fixed threshold, for instance, with a threshold of seven. The output from the simple binarizing circuitry 4 is output to the binary image window circuitry 5, which is shown in FIG. 2.

Figure 2:
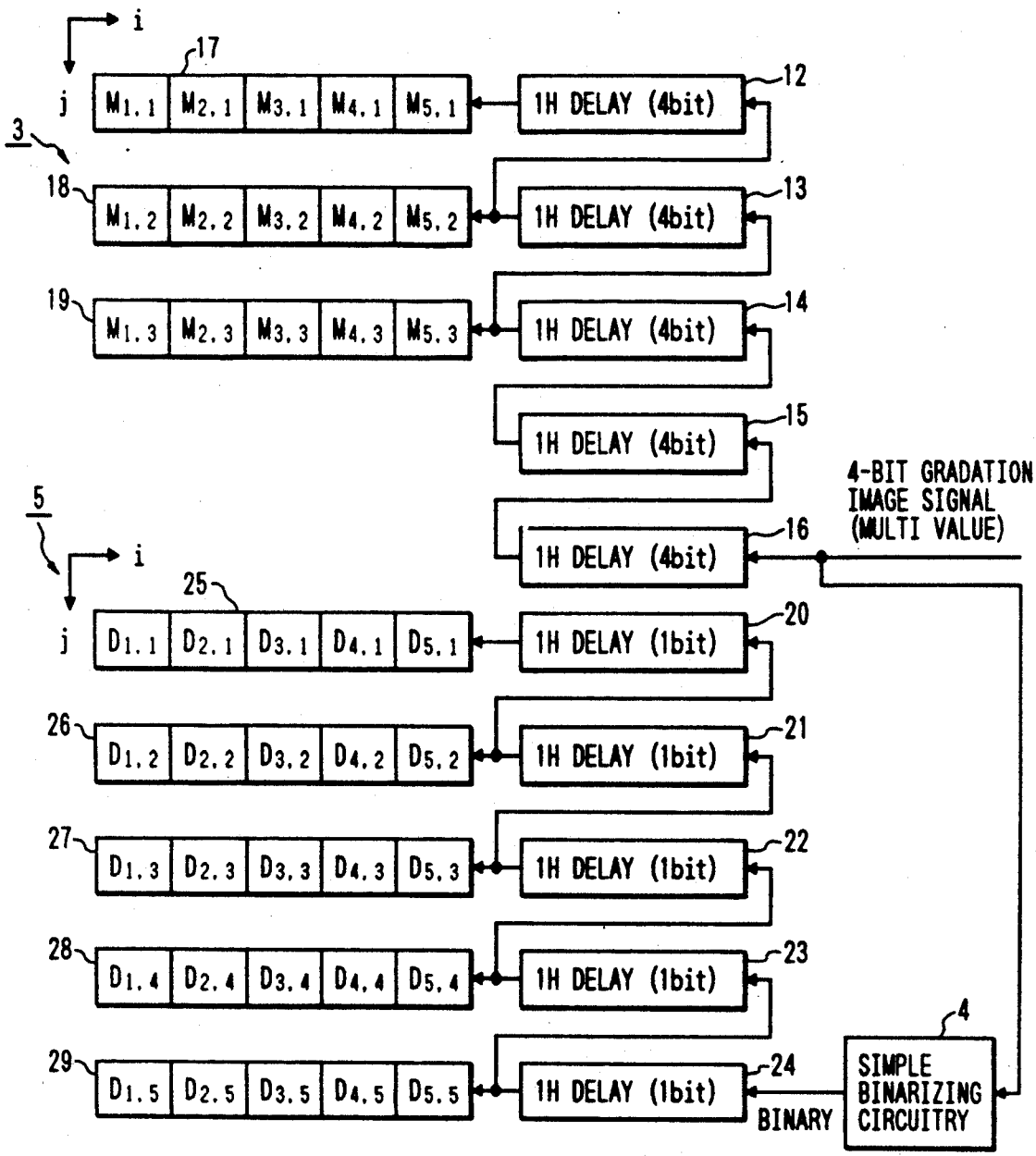
FIG. 2 is a view showing in detail the structures of multi-value image window circuitry and binary image window circuitry.

In FIG. 2, the binary image window circuitry 5 has five elements or 1H delay elements 20-24, each of which elements is used for delaying raster scanning in an amount equal to one line (hereinafter referred to as 1H). The five 1H delay elements 20-24 delay the raster scanning in an amount equal to five lines, thus generating two-dimensional binary image data. The two-dimensional binary image data is then input to shift registers 25-29 so as to create a window of 5×5 pixels. "i" in an expression $D_{i,j}$ (i=1 to 5, j=1 to 5), shown in the shift registers 25-29, indicates time required for delaying the raster scanning in an amount equal to one line. "j" in $D_{i,j}$ indicates which line of five lines 1H to 5H is being processed. The higher value "i" assumes, the more the pixels are delayed, and the higher value "j" assumes, the more the lines are delayed. The expression $D_{i,j}$ indicates the values ("1" or "0") of the pixels after these pixels have been simply binarized.

As shown in FIG. 2, similarly, the multi-value image window circuitry 3 is composed of 1H delay elements 12-16. A window of the multi-value image window circuitry 3 is composed of 5×3 pixels. In this drawing, an expression $M_{i,j}$ indicates the values (0 to 15) of these pixels.

Figure 4:
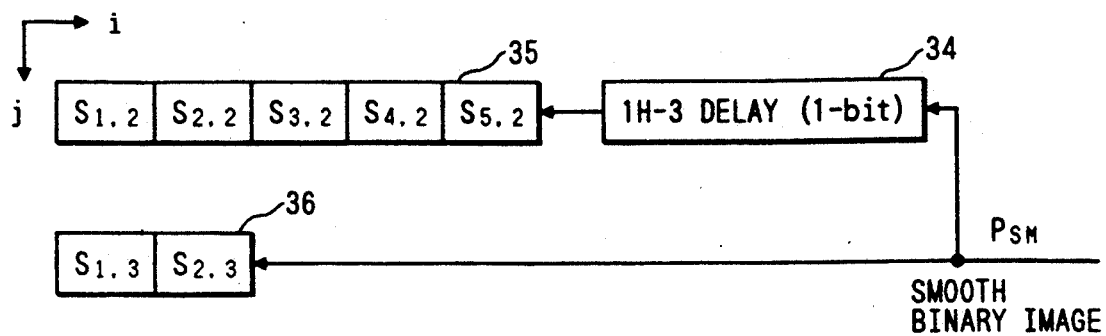
FIG. 4 is a view showing in detail the structure of smooth binary window circuitry.

As illustrated in FIG. 4, the smooth binary image window circuitry 9 is made up of a 1H-3 delay line 34 and shift registers 35 and 36.

Figure 6:
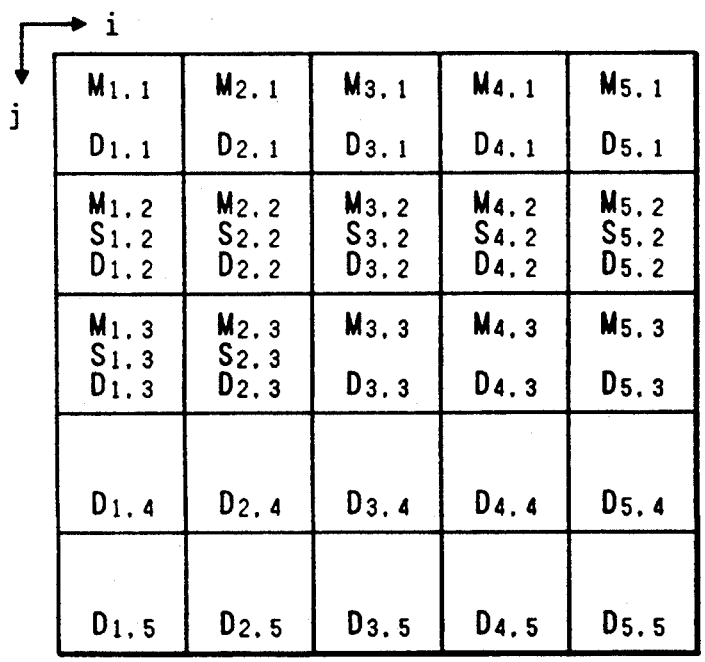
FIG. 6 is a view showing the relative positions of pixels of signals which are output from the multi-value image window circuitry, the binary image window circuitry, and the smooth binary image window circuitry of this invention.

FIG. 6 shows the relative positions of three image data items $(M_{i,j})$, $(D_{i,j})$, and $(S_{i,j})$ on a time base. That is, the outputs from three types of window circuitry 3, 5, and 9 are synchronous with an unillustrated clock.

As shown in FIGS. 3A to 3D, the edge detecting circuitry 7 is equipped with four types of edge templates: a 90° edge template 30, a 0° edge template 31, a 135° edge template 32, and a 45° edge template 33. The four templates 30-33 determine that an edge s present on data items $C_1$ to $C_5$ if either of the following two conditions is met:

$A_1$ to $A_5=1$ and $B_1$ to $B_5=0$ or $A_1$ to $A_5=0$ and $B_1$ to $B_5=1$

Therefore, these four types of templates 30-33 are

Therefore, these four capable of detecting a total of four types of edge directions. Once an edge is thus detected, four types of edge direction flags are set in accordance with the edge direction detected. Such edge direction flags are to be set synchronously with center pixels $(D_{3,3})$ and $(M_{3,3})$ of the window of 5×5 pixels, which are created by the binary image window circuitry 5 shown in FIG. 2. In other words, the edge direction flags are set when an edge is present which passes, at a given time "t", the center pixel ($D_{3,3}$) of a group of data items within the window ($D_{i,j}$).

Figure 5A:
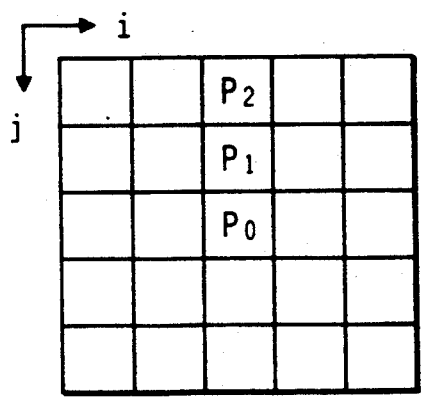
FIGS. 5A to 5D are views showing the relative positions of four types of edge multi-value data strings used for generating addresses in first look-up table circuitry of FIG. 1.
Figure 5B:
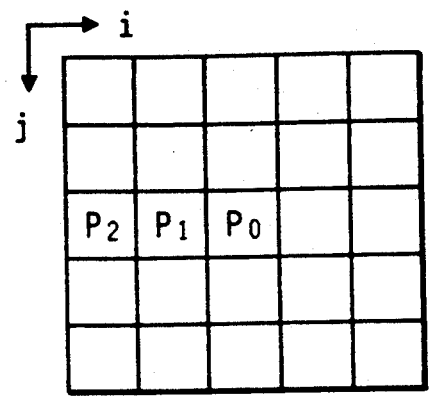
Figure 5C:
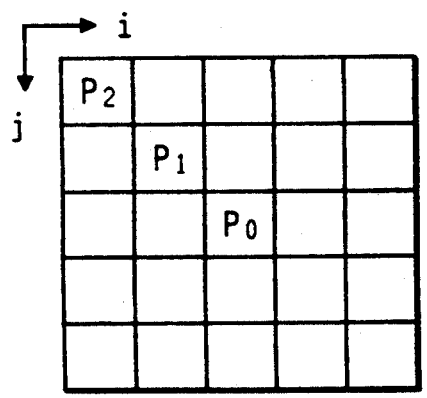
Figure 5D:
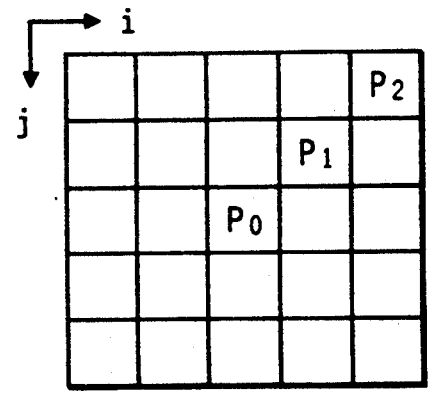
Figure 7:
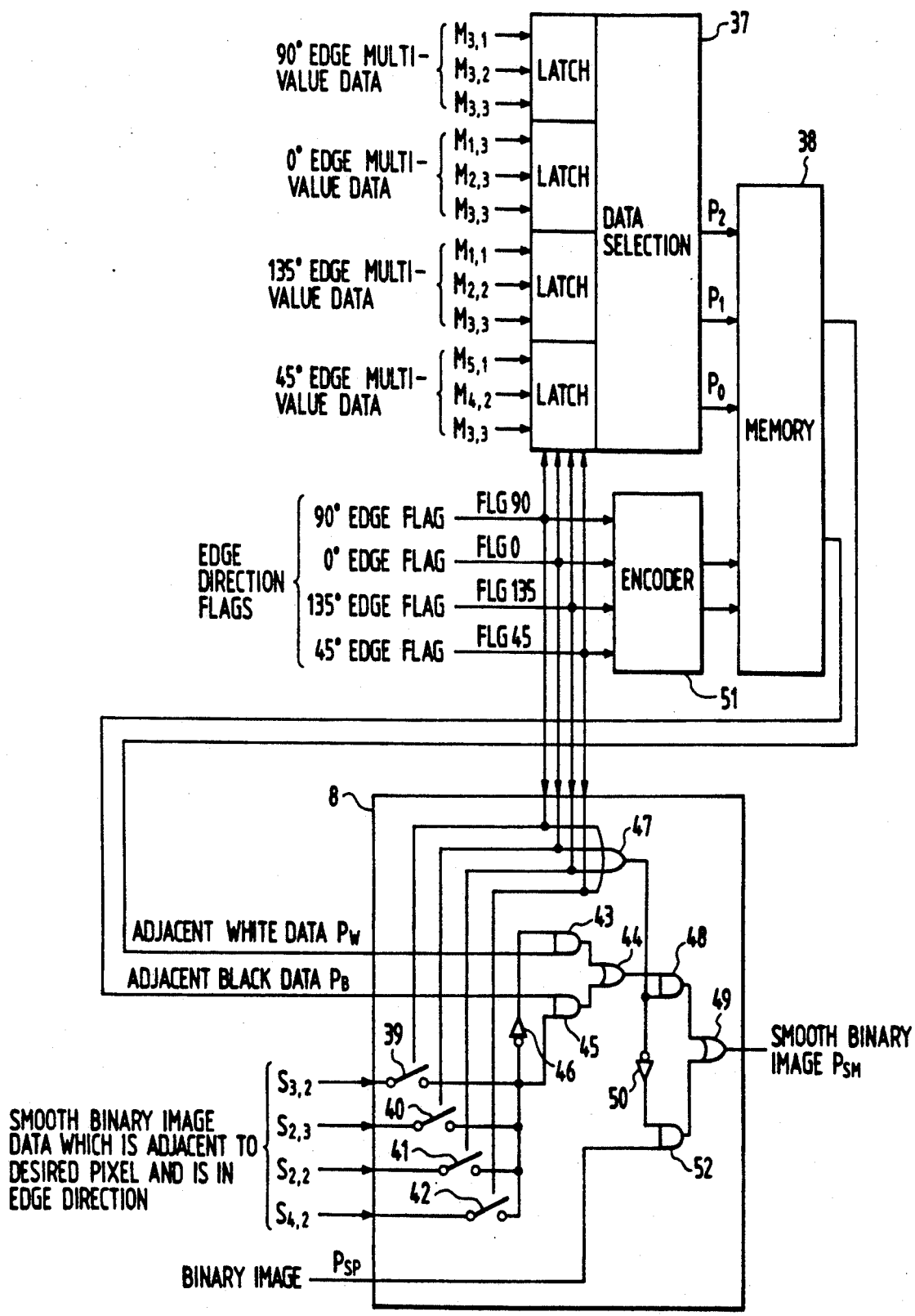
FIG. 7 is a view showing in detail the structures of the look-up table circuitry and image selecting circuitry of FIG. 1.

The outputs or edge direction flags from the edge detecting circuitry 7 and the outputs or a group of multi-value data items ($M_{i,j}$) are input to latching/data selecting circuitry 37 shown in FIG. 7. The latching-/data selecting circuitry 37 selects one multi-value data string out of the four types of multi-value data strings shown in FIGS. 5A to 5D, and generates a part of an address which refers to data stored in a memory 38 of the look-up table circuitry 6. This selection is based on the types of edge direction flags. For example, when the 0° edge template 31 in FIG. 3B detects an edge, a 0° edge direction flag is set and latches three 0° edge multi-value data items ($M_{1,3}$, $M_{2,3}$, $M_{3,3}$) in the latching/data selecting circuitry 37, as illustrated in FIG. 7. These three multi-value data items ($M_{1,3}$, $M_{2,3}$, $M_{3,3}$) are data ($M_{i,j}$) which correspond to the position of the 0° edge multi-value data string ($P_2$, $P_1$, $P_0$) shown in FIG. 5B. In other words, the multi-value data string ($P_2$, $P_1$, $P_0$) changes, based on the types of edge direction flags which have been set, its position so as to correspond to any data item of the group of multi-value data items ($M_{i,j}$). It is thus possible to refer to the data stored in the memory 38, regardless of edge directions.

Next, the multi-value data string ($P_2$, $P_1$, $P_0$) which has been latched and selected by the latching/data selecting circuitry 37, is input to the memory 38 as a part of an address. At the same time, the edge direction flags are also input through an encoder 51 to the memory 38 in the form of 2-bit addresses. Thus, since multi-value data items $P_2$, $P_1$, $P_0$ are each composed of four bits, the total number of the multi-value data string ($P_2$, $P_1$, $P_0$) is 12 bits. These 12 bits are added to another two bits which are used for indicating the edge directions. This creates 14-bit addresses that are input to the memory 38, in which information is stored regarding edges indicated by a combination of the 14-bit addresses. In other words, in the memory 38 smooth binary data is stored which determines whether the center pixel or multi-value data ($M_{3,3}$) at the center of the window of 5×5 pixels should be converted into a "1" or "0".

However, no binary image data which has been smoothly binarized and positioned immediately previous to the center pixel is input to the memory 38. A smooth binary image ($S_{2,3}$) located to the left of the center pixel ($M_{3,3}$) when the 0° edge is detected, will be explained as an example of such a case. If the center pixel ($M_{3,3}$) is generated at time t1, the smooth binary image ($S_{2,3}$) has been generated at time t0 (where t0<t1). The interval between times t1 and t0 is only the time which is equal to one clock cycle used for synchronizing the circuitry of this embodiment. Thus, when high resolution cameras of today are employed, one pixel or one clock cycle reaches as high as dozens of megaHertzs. Therefore, in a real-time image processing, the time required for a pixel at time t0 to be returned in the form of feedback to a circuit which binarizes a pixel at time t1, is extremely short. In the present invention, to avoid such a problem, when the previous smooth binary image is either a "1" or "0", two data items, i.e., white data $P_W$ and black data $P_B$, are output beforehand from the memory 38. These two data items are used for binarizing the pixel ($M_{3,3}$) currently processed.

Figure 9:
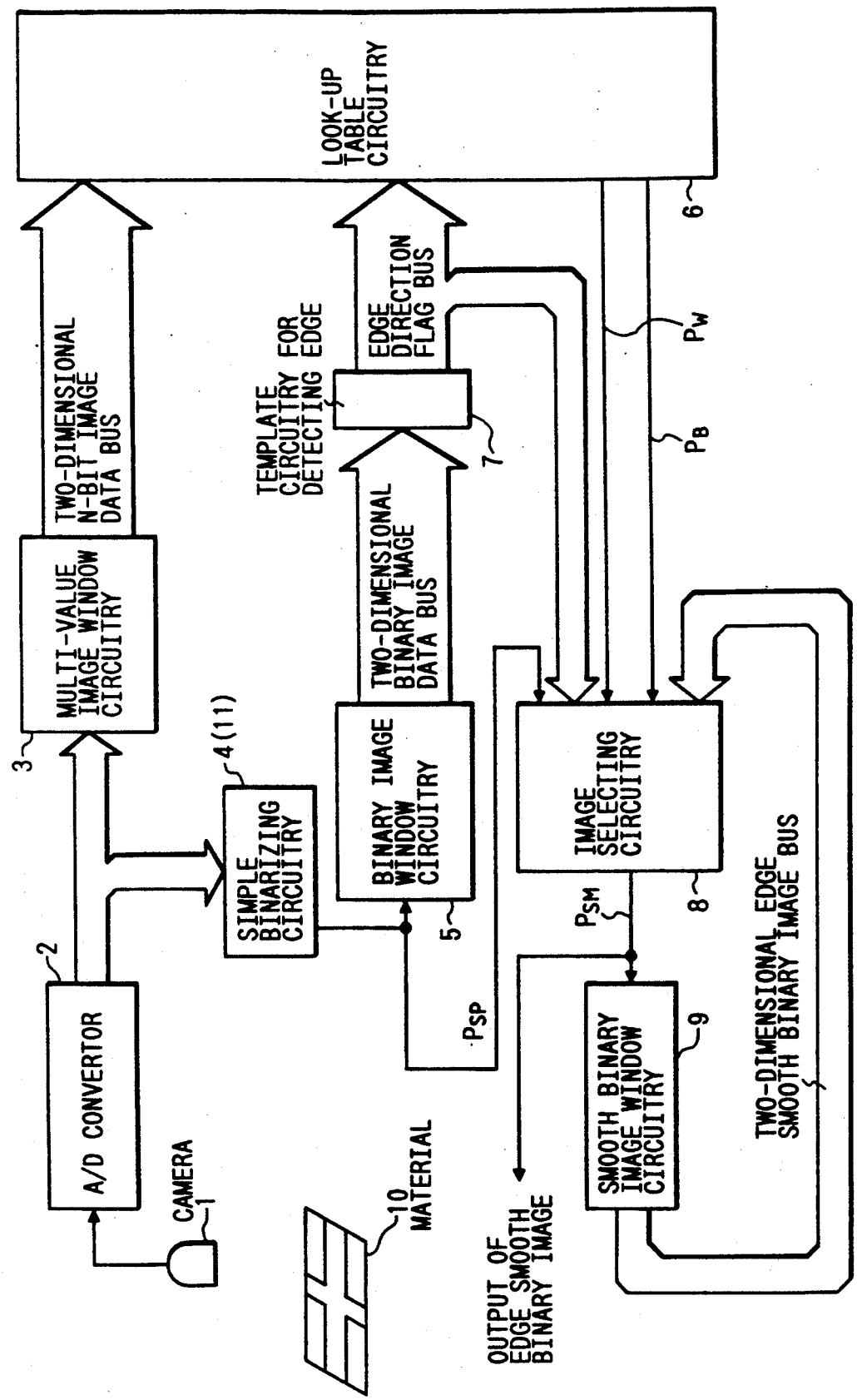
FIG. 9 is a block diagram of a second embodiment of the image binarizing apparatus, this second embodiment being a result of minute modifications to the first embodiment of FIG. 1.

Finally, a smooth binary image which is adjacent to a desired pixel and is in an edge direction (hereinafter referred to as adjacent smooth binary image in the edge direction) is returned in the form of feedback from the smooth binary image window circuitry 9 to the image selecting circuitry 8 as constructed in FIG. 7. By this feedback, the image selecting circuitry 8 selects either image data $P_W$ or $P_B$ which is output from the memory 38. In other words, the image selecting circuitry 8 is conditioned to select the image data $P_W$ when the adjacent smooth binary image in the edge direction is a "1", while on the contrary, it selects the image data $P_B$ when the adjacent smooth binary image in the edge direction is a "0". When no edges are detected, the image selecting circuitry 8 is also conditioned to unconditionally send an output from a binarizing circuit 11 in the form of a smooth binary image $P_{SM}$. Because an object of the present invention is to smooth edges, the construction of the circuitry is such that when no edges are detected, the results of other binarizing circuits may be utilized. Simple binarizing circuitry 4, as shown in FIG. 9, may also be used together with such binarizing circuitry. An example where a fine light and shade pattern and a light and shade edge are accurately binarized will be explained with reference to FIG. 10.

As illustrated in FIG. 7, in the image selecting circuit 8, any one of the electronic switches 39 to 42 selects one data item out of the adjacent smooth binary data items in the edge direction, which are output from the binary smooth window circuitry 9. The electronic switches 39 to 42 are selectively turned ON, depending on the edge direction flags. A circuit, composed of an invertor 46, an OR gate 44, and AND gates 43 and 45, selects either image data $P_W$ or $P_B$ sent from the memory 38. Furthermore, when the four types of edge direction flags are not sent from an OR gate 47, a circuit, made up of an inverter 50, an OR gate 49, and AND gates 48 and 52, selects and outputs the binary image data $P_{SP}$ which is transmitted from a binarizing circuit 11.

A look-up table stored in the memory 38 of FIG. 7 will now be explained.

FIG. 8 shows an example of a threshold table determining a threshold which is used for smoothly binarizing image data $C_3$ currently processed. The image data $C_3$ is one image data item in a sample of three image data items $C_1$, $C_2$, and $C_3$, which are lined in an edge direction on one of the four edge templates shown in FIGS. 3A to 3D. The image data $C_3$ is smoothly binarized based on the two data items $C_1$ and $C_2$.

In FIG. 8, first, the threshold is divided into two threshold groups, depending on whether the result of binarizing the previous data $C_2$ is a "0" (black) or "1" (white). Next, the value of data $C_1$ is compared with that of data $C_2$. The two threshold groups are divided further into two more threshold groups, depending on the result of this comparison. Finally, a value corresponding to data $C_3$ in a group which is selected based on the value of the previous data $C_2$ is determined as a threshold used for binarizing data $C_3$.

For instance, in the case of 4-bit, hexadecimal data, if ($C_1$, $C_2$, $C_3$)=(6, 6, 7), and
if a result of binarizing the previous data $C_2$ is a "0" (black), then
$C_1 \geq C_2$ Thus, a threshold of "8" which is circled is selected. As a result, $C_3 = 7$ is binarized into a "0" (black).

The result of binarizing the previous data $C_2$ must be ascertained before a threshold for binarization is determined based on the threshold table. However, the above result is not accessible to the threshold table because a processing cycle mentioned above is limited. To eliminate such a disadvantage, in the threshold table of FIG. 8 according to the present invention, two types of thresholds are determined when the result of binarizing the previous data $C_2$ is a "0" (black) and "1" (white). The previous data $C_2$ is binarized based on these two types of thresholds. The results of this binarization are then stored beforehand in the memory 38 in the form of data $P_B$ and $P_W$. The look-up table is thus created.

For example, in the case of $(C_1, C_2, C_3)=(6, 6, 7)$, because the result of binarizing the previous data $C_2$ is not ascertained, the following two binary data items $P_B$ and $P_W$ are stored in the memory 38:

(1) Data $P_B$ used for binarizing Data $C_3$ based on a threshold of "8" when the above result is a "0" (black)
(2) Data $P_W$ used for binarizing Data $C_3$ based on a threshold of "5" when the above result is a "1" (white)

The two binary data items $P_B$ and $P_W$ are then read by accessing to the look-up table.

In the above embodiment, image data $P_W$ of "1" and image data $P_B$ of "0" are stored in the memory 38 of the look-up circuitry 6. When an edge is detected, these two image data items are read, and then either one of them is selected. However, if a difference of multi-value data of pixels on an edge exceeds the range of a quantization error, for instance, if an edge, such as the one composed of multi-value data "9", "8", "5", "9", and "8" having 16-gradations is present, and if a multi-value data string composed of "9", "8", and "5" is input in the form of an address of the memory 38, then the contents of the memory 38 may also be set so that image data items $P_B$ and $P_W$ of an output which corresponds to "5" are both converted into "0". Thus, by only changing the contents of the memory 38, it is also possible to arbitrarily set degrees to which abnormal patterns, such as incomplete edges and projections present on edges, can be reproduced while the multi-value image data is binarized.

In the above embodiment, though a window of 5×5 pixels are used for detecting edges, the size of a window is not limited to the above size in the present invention. As the size of a window increases, more angle edges can be detected accordingly, which makes it possible to smooth edges in a finer manner. In such a case, types of templates for detecting edges also increase.

In addition, in the above embodiment, when an edge of multi-value data, such as "9", "8", "5", "9", and "8", is present, image data items $P_W$ and $P_B$ of an output corresponding to "5" are both converted into "0" by altering the contents of the memory 38. However, in the present invention, if the contents of the memory 38 are also set so as to convert these image data items $P_W$ and $P_B$ into "1", it is possible to disregard fine defects of the edges.

Figure 10:
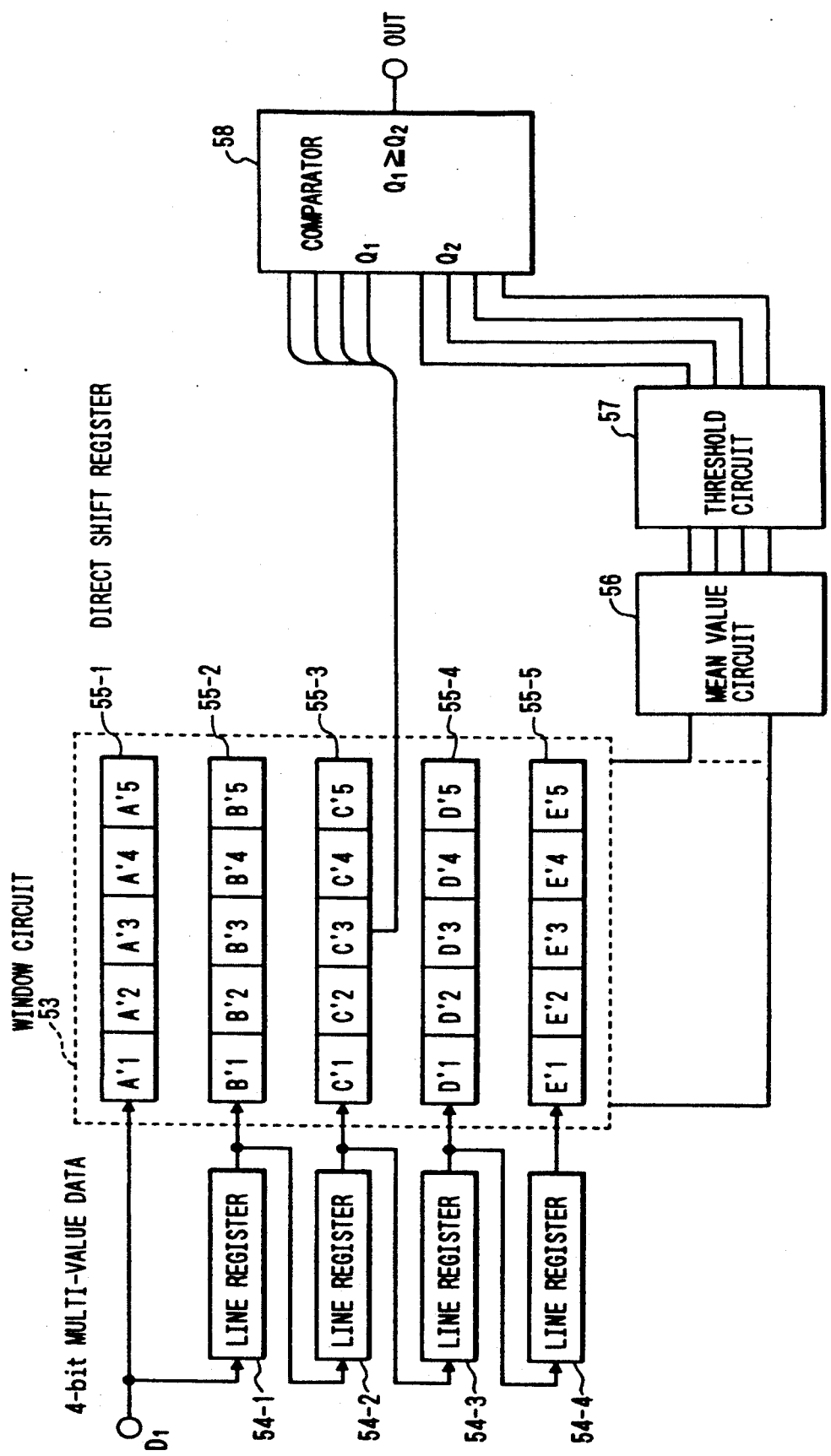
FIG. 10 is a block diagram showing an embodiment of a binarizing circuit shown in FIG. 1.

An example of a binarizing circuit 11 will now be described with reference to FIG. 10 and the subsequent drawings. A window circuit 53 arranges multi-value image data which has been input in a two-dimensional window of 5×5 pixels, and then it retrieves the multi-value data of a desired pixel within the window and the multi-value data of plural pixels around the desired pixel. An analog video signal from the camera 1 is converted, in accordance with light and shade, into multi-value image data by the A/D converter 2. The multi-value image data is then input pixel by pixel to the window circuit 53 via its input terminal in the form of data composed of "N" bits. It is further fed to line registers 54-1 to 54-4 and serial shift registers 55-1 to 55-5 in the window circuit 53. The line registers 54-1 to 54-4 are connected in series to each other, and are used for delaying the multi-value data in an amount equal to one scanning. The output of the line register 54-1 delays the multi-value data in an amount equal to one line; the output of the line register 54-2 delays it in an amount equal to two lines; the output of the line register 54-3 delays it in an amount equal to three lines; and the output of the line register 54-4 delays it in an amount equal to four lines. Thus, a signal which has been delayed in an amount equal to one line is input to the serial shift register 55-2; the signal which has been delayed in an amount equal to two lines is input to the serial shift register 55-3; the signal which has been delayed in an amount equal to three lines is input to the serial shift register 55-3; and the signal which has been delayed in an amount equal to four lines is input to the serial shift register 55-5. The line registers 54-1 to 54-4 and the serial shift registers 55-1 to 55-5, shift data in an amount equal to one line. This shifting of the data is performed by inputting a clock signal in an amount equal to one scanning from a device such as a CCD. The serial shift registers 55-1 to 55-5 constitute the window circuit 53 that is used for a window composed of 25 pixels. This window is formed in such a manner that five horizontal pixels and five vertical pixels are two-dimensionally arranged.

Plural pixels around a specific pixel data item (desired pixel) C'3 are output to a mean value circuit 56. This desired pixel C'3 is located at the center of the window of 5×5 pixels cut by the window circuit 53, and is currently processed. In other words, as shown in FIG. 11, 12 pixel data items (A'2, A'3, A'4, B'1, B'5, C'1, C'5, D'1, D'5, E'2, E'3, E'4) are input to the mean value circuit 56. These 12 data items are indicated by shaded portions around the desired pixel C'3 at the of the window "W", cut by the window circuit 53, and are disposed about the circumference of a circle having a fixed radius.

The mean value circuit 56 calculates the mean value of the 12 pixel data items in the shaded portions, and outputs the calculation result. It may be, for example, a ROM or a RAM composed of a look-up table which utilizes addresses generated by multi-value image data composed of the 12 pixels.

The mean value of the 12 data items of the surrounding pixels calculated by the mean value circuit 56 is fed to a threshold circuit 57 in order to determine a threshold for binarization. The threshold circuit 57 is provided with a so-called data table, such as that shown in FIG. 13, which is composed of a ROM or a RAM for converting the mean value into a threshold. The threshold calculated by the threshold circuit 57 is fed to the input of a comparator 58, to which the output of the desired pixel C'3 at the center of the window "W", which is cut by the window circuit 53, is fed. Thus, the comparator 58 binarizes the desired pixel data C'3 at the center of the window "W", as shown in FIG. 11. This binarization is based on the threshold obtained by the mean value of the 12 data items of the surrounding pixels, indicated by the shaded portions.

That is, the comparator 58 is a digital comparator.

When (input $Q_1$)≧(input $Q_2$), the comparator 58 outputs a logical value "1".

On the other hand, when (input $Q_1$)<(input $Q_2$), the comparator 58 outputs a logical value "0".

An operation for binarizing an image signal in accordance with an embodiment shown in FIG. 10 will now be described.

FIG. 12 shows the presence of dark patterns 59 and 60. The desired pixel C'3 at the center of the window "W" travels on a scanning line 61 of a CCD. An analog image signal obtained at this time is a signal $Q_1$. At the same time, a threshold signal obtained, based on the mean value of the mean value circuit 56, by the threshold circuit 57 is a signal $Q_2$A binary signal produced by these signals $Q_1$ and $Q_2$ is obtained from the output of the comparator 58 in the form of a signal $Q_3$.

It is possible to accurately binarize an image signal having a small modulation factor, such as that shown in FIG. 12 in which there are the fine dark pattern 59 separated from other patterns and a fine light pattern 62 in the large rectangular dark pattern 60.

The fine light pattern 62 shown in FIG. 12 is regarded as multi-value data shown in FIG. 14A, whereas the fine dark pattern 59 is regarded as multi-value data illustrated in FIG. 15A.

The fine light pattern enclosed by a broken line of FIG. 14A will be first explained. When the fine light pattern in FIG. 14A is simply binarized with a fixed threshold of "7", as shown in FIG. 14B, information regarding this fine light pattern is not obtained due to a low modulation factor of the fine light pattern. Thresholds for fine pixels composed of multi-value data items "3" and "2", enclosed by the broken line of FIG. 14A, are determined by the mean value of pixels around the multi-value data items "3" and "2" in the following way.

First, if the 12 pixels around the pixel (regarded as the desired pixel C'3 in FIG. 11) of the multi-value data item "3" are arranged as shown in FIG. 11, then the following is obtained:

$A'2=0, A'3=0, A'4=0,, B'1=0,$ $B'5=0, C'1=0, C'5=0,, D'1=0,$ $D'5=0, E'2=0, E'3=0,, E'1=0.$

Thus the mean value of the 12 pixels is "0".

Therefore, in this instance, a threshold for the multi-value data item "3" is "2" based on the data table of FIG. 13.

Next, if the 12 pixels around the pixel (regarded as the desired pixel C'3 in FIG. 11) of the multi-value data item "2" are arranged as shown in FIG. 11, then the following is obtained:

$A'2=0, A'3=0, A'4=0, B'1=0,$ $B'5=0, C'1=0, C'5=0, D'1=0,$ $D'5=0, E'2=0, E'3=0, E'4=0.$

Thus the mean value of the 12 pixels is also "0".

Therefore, in this case also, a threshold for the multi-value data item "2" is "2" based on the data table of FIG. 13.

The thresholds for the fine pixels of the multi-value data items "3" and "2" are thus "2" and "2", respectively. The results of binarizing these multi-value data items are therefore "1" and "1". As shown in FIG. 14C, information regarding the fine light pattern can be accurately binarized with complete reliability.

Similarly, when multi-value data items "12" and "11" of the fine pixels, which are enclosed by a broken line of FIG. 15A and which indicate the fine dark pattern, are simply binarized, information regarding the fine dark pattern is not obtained as shown in FIG. 15B. According to the binarization of the present invention, however, if 12 pixels around the left pixel of the above two pixels "12" and "11", enclosed by the broken line of FIG. 15A, that is, if the 12 pixels around the multi-value data item "12" are arranged as shown in FIG. 11, then the following is obtained:

$A'2=15, A'3=15, A'4=15, B'1=15,$ $B'5=15, C'1=15, C'5=15, D'1=15,$ $D'5=15, E'2=15, E'3=15, E'4=15.$

Thus the mean value of the 12 pixels is "15".

Therefore, a threshold for the multi-value data item "12" is "13" based on the data table of FIG. 13.

Next, if the 12 pixels around the right pixel, i.e., if the 12 pixels around the multi-value data item "11" are arranged as shown in FIG. 11, then the following is obtained:

$A'2=15, A'3=15, A'4=15, B'1=15,$ $B'5=15, C'1=15, C'5=15, D'1=15,$ $D'5=15, E'2=15, E'3=15, E'4=15.$

Thus the mean value of the 12 pixels is also "15".

Therefore, a threshold for the multi-value data item "11" is also "13" based on the data table of FIG. 13.

Thus, the thresholds for the multi-value data items "12" and "11" are both "13" and "13". The results of binarizing these multi-value data items "12" and "11" are "0" and "0", respectively. As shown in FIG. 15C, information regarding the fine dark pattern can thus be accurately binarized with complete reliability.

A binarizing will be explained where there exists the dark pattern 60A in which a fine triangular projection is in a light and shade portion of the large rectangular dark pattern 60 of FIG. 12.

FIG. 16A shows multi-value data. FIG. 16B shows the multi-value data after it has been simply binarized with a threshold of "7". The edge projecting vertically from the light and shade portion is binarized as a projection of one pixel. An apex peculiar to the triangular projection, and one pixel corresponding to this apex are lost after the multi-value data has been simply binarized, though a triangular shape of projection should be naturally formed.

On the other hand, when the dark pattern 60A of FIG. 12 is binarized in accordance with the present invention, the mean value of the pixels around the pixel A'''is "10". This pixel A'' is composed of multi-value data "8" and is used for forming the peak of the fine triangular projection of the dark pattern 60A of FIG. 12. Thus, a threshold of "10" for binarizing the multi-value data "8" of FIG. 16A is determined based on the data table of FIG. 13. When the image data of FIG. 16A is binarized with this threshold of "10", it is converted into binary data as shown in FIG. 16C. The pixel A'' having a value of "8" at the peak of the fine triangular projection is binarized into a "0". It is thus possible to accurately binarize the dark pattern 60A with its peak projecting accurately.

In the above embodiment, a threshold is calculated based on the mean value of 12 pixels which are arranged about the circumference of a circle having a fixed radius and which are arranged around a desired pixel. However, the number and positions of pixels around the desired pixel are not limited to those in the embodiments mentioned above. It may also be possible to arbitrarily select appropriate pixels around the desired pixel so as to calculate their mean value, depending on the characteristics and the like of images.

We claim:

1. 1 An image binarizing apparatus for binarizing the data item of a desired pixel among the multi-value image data items of pixels composed of plural bits, the multi-value image data items being output from an image taking device in a time series manner, said image binarizing apparatus comprising:

multi-value image window circuitry for obtaining said multi-value image data items in the form of two dimensions, whereby said multi-value image window circuitry cuts a two-dimensional image in a small field of vision from an image plane to be taken;

a first binarizing circuit for binarizing said multi-value image data items in accordance with a variable threshold which is determined based on said multi-value image data items of the pixels around said desired pixel;

a second binarizing circuit for binarizing said multi-value image data items in accordance with a predetermined threshold;

binary image window circuitry for obtaining image data which has been binarized by said second binarizing circuit, whereby said binary image window circuitry cuts a binary two-dimensional image in a small field of vision from an image plane to be taken;

edge detecting circuitry for comparing and collating the binary two-dimensional image data obtained by said binary image window circuitry with edge templates each having a predetermined angle, whereby said edge detecting circuitry detects whether or not the position of said desired pixel is on an edge, and outputs an edge direction in the form of edge detection data when the position of said desired pixel is on the edge;

memory circuitry for storing two types of smoothly binarized data in addresses which are generated based not only on the multi-value image data items obtained by said multi-value image window circuitry, but also on the edge detection data which is output from said edge detecting circuitry, the two types of smoothly binarized data stored in said memory circuitry being dependent on the smooth binary image data of a pixel adjacent to said desired pixel in said edge direction, said memory circuitry outputting two types of smooth binary image data in the addresses which correspond to said multi-value image data items and said edge detection data; and selecting circuitry for selecting either one of the two types of smooth binary image data which are output either from said first binarizing circuit or from said memory circuitry, whereby when said edge detecting circuitry detects that an edge is not present, said selecting circuitry selects an output from said first binarizing circuit, while on the contrary, when said edge detecting circuitry detects that an edge is present, said selecting circuitry selects either one of the two types of smooth binary image data which are output from said memory circuitry, this selection being based on the smooth binary image data of the pixel adjacent to said desired pixel in the edge direction.

2. An image binarizing apparatus according to claim 1, wherein said second binarizing circuit binarizes said multi-value image data items by using a level at the center of said multi-value image data items as a threshold.

3. An image binarizing apparatus according to claim 1, said first binarizing circuit including:

a window circuit which arranges said multi-value image data items in a two-dimensional N×N window, and which obtains both the image data of a desired pixel within said window and the image data of plural pixels around said desired pixel;

a mean value circuit for determining the mean value of the image data of the plural pixels around said desired pixel, which image data is obtained by said window circuit;

a threshold circuit for calculating a threshold based on the mean value determined by said mean value circuit; and a comparator for binarizing the image data of said desired pixel in accordance with the threshold calculated by said threshold circuit.

4. An image binarizing apparatus according to claim 1, wherein said edge templates of said edge detecting circuitry are provided for angles of zero degree, 45 degrees, 90 degrees, and 135 degrees, and wherein said memory circuitry includes:

a first latch circuit for latching zero-degree edge multi-value data items which are arranged at an angle of zero degree and are among said multi-value image data items;

a second latch circuit for latching 45-degree edge multi-value data items which are arranged at an angle of 45 degrees and are among said multi-value image data items;

a third latch circuit for latching 90-degree edge multi-value data items which are arranged at an angle of 90 degrees and are among said multi-value image data items;

a fourth latch circuit for latching 135-degree edge multi-value data items which are arranged at an angle of 135 degrees and are among said multi-value image data items;

a data selecting circuit for selecting, based on an output from said edge detecting circuitry, the contents of said first, second, third, and fourth latch circuits; and look-up table circuitry for inputting, in the form of an address signal, both data selected by said data selecting circuits and an output from an edge direction selecting circuit, said look-up table circuitry outputting adjacent white data $P_W$ and adjacent black data $P_B$ in the form of said two types of smooth binary image data.

5. An image binarizing apparatus according to claim 1, wherein said selecting circuitry includes image selecting circuitry and smooth binary window circuitry, wherein when said edge detecting circuitry detects that an edge is not present, said image selecting circuitry selects the output from said first binarizing circuit, while on the contrary, when said edge detecting circuitry detects that an edge is present, said image selecting circuitry selects either one of the two types of smooth binary image data which are output from said memory circuitry, this selection being based on the smooth binary image data of the pixel adjacent to said desired pixel in the edge direction, and wherein said smooth binary window circuitry forms a two-dimensional window composed of the smooth binary image data which is selected by said image selecting circuitry to which the smooth binary image data of the pixel adjacent to said desired pixel in said edge direction, is input.

6. An image signal binarizing apparatus for binarizing the data item of a desired pixel among multi-value image data items of pixels composed of plural bits, the multi-value image data items being output from an image taking device in a time series manner, said image signal binarizing apparatus comprising:

multi-value image window circuitry for obtaining said multi-value image data items in the form of two dimensions, whereby said multi-value image window circuitry cuts a two-dimensional image in a small field of vision from an image plane to be taken;

a binarizing circuit for binarizing said multi-value image data items in accordance with a predetermined threshold;

binary image window circuitry for obtaining image data which has been binarized by said binarizing circuit, whereby said binary image window circuitry cuts a binary two-dimensional image in a small field of vision from an image plane to be taken;

edge detecting circuitry for comparing and collating binary two-dimensional image data retrieved by said binary image window circuitry with edge templates each having a predetermined angle, whereby said edge detecting circuitry detects whether or not the position of said desired pixel is on an edge, and outputs an edge direction in the form of edge detection data when the position of said desired pixel is on the edge;

memory circuitry for storing two types of smoothly binarized data in addresses which are generated based not only on the multi-value image data items obtained by said multi-value image window circuitry, but also on the edge detection data which is output from said edge detecting circuitry, the two types of smoothly binarized data stored in said memory circuitry being dependent on the smooth binary image data of a pixel adjacent to said desired pixel in said edge direction, said memory circuitry outputting two types of smooth binary image data in the addresses which correspond to said multi-value image data items and said edge detection data; and selecting circuitry for selecting either one of the two types of smooth binary image data which are output either from said binarizing circuit or from said memory circuitry, whereby when said edge detecting circuitry detects that an edge is not present, said selecting circuitry selects an output from said binarizing circuit, while on the contrary, when said edge detecting circuitry detects that an edge is present, said selecting circuitry selects either one of the two types of smooth binary image data which are output from said memory circuitry, this selection being based on the smooth binary image data of the pixel adjacent to said desired pixel in said edge direction.

7. An image signal binarizing apparatus for binarizing multi-value image data, comprising:

a window circuit for arranging multi-value image data having been input in a two-dimensional N×N window to obtain both the image data of a predetermined pixel within said window and the image data of plural pixels around said predetermined pixel;

a mean value circuit for determining the mean value of the image data of the plural pixels around said predetermined pixel, which image data is obtained by said window circuit;

a threshold circuit for calculating a threshold based on the mean value determined by said mean value circuit; and a comparator for binarizing the image data of said predetermined pixel in accordance with the threshold calculated by said threshold circuit.

* * * * *